US006459560B1

(12) United States Patent
Beribisky

(10) Patent No.: US 6,459,560 B1
(45) Date of Patent: Oct. 1, 2002

(54) STATIC SHOCK PREVENTING DEVICE

(76) Inventor: Vladimir Beribisky, Apt. 107 - 1 Canyon Avenue, Toronto, Ontario (CA), M3H 4X8

( * ) Notice: Subject to any disclaimer, the term of this patent is extended or adjusted under 35 U.S.C. 154(b) by 0 days.

This patent is subject to a terminal disclaimer.

(21) Appl. No.: 09/590,127

(22) Filed: Jun. 9, 2000

Related U.S. Application Data

(60) Provisional application No. 60/138,661, filed on Jun. 14, 1999.

(51) Int. Cl.[7] .................................... H02H 47/00
(52) U.S. Cl. .................................... 361/220; 361/212
(58) Field of Search .................................... 361/212, 220

(56) References Cited

U.S. PATENT DOCUMENTS 3,745,412 A * 7/1973 Ruff ........................... 361/220
4,570,200 A * 2/1986 Osada et al. ................ 361/220
4,852,374 A * 8/1989 Gotanda ..................... 361/212

* cited by examiner

*Primary Examiner*—Stephen W. Jackson
(74) *Attorney, Agent, or Firm*—Adrian D. Battison; Michael R. Williams

(57) ABSTRACT

A device is provided for discharging static electricity between a person and an grounded object to prevent unpleasant static shock to the person includes an insulated housing supporting a first contact arranged for manual engagement, a second contact for contacting the grounded object and a conductor of high resistance therebetween for allowing transmission of current at a rate which is sufficiently low to avoid shock. The device is in one arrangement a manually transportable element such as a key-holder where connection to the person is effected through the keys and key ring, a bracelet, a pen or the like which has an ancillary function so that it is regularly carried by the person. In an alternative arrangement, the device is provided on an object such as a door handle presented toward the person where the manually engageable contact comprises a pad presented forwardly of the grounded object such as the door.

3 Claims, 1 Drawing Sheet

STATIC SHOCK PREVENTING DEVICE

This application claims priority under 35 U.S.C. 119 from provisional application Ser. No. 60/138,661 filed Jun. $14^{th}$ 1999.

This invention relates to a static shock preventing device which allows a person to prevent static electricity built up between the person and another object at a different potential which may be grounded or not from shocking the person as the person contacts a grounded conductor.

Many situations cause persons to become charged by static electricity for example during driving a car, walking on synthetic carpet and handling synthetic fabrics and when charged, that person gets a shock when the static is rapidly discharged through a grounded conductor such as a door, vehicle body, filing cabinet or the like. While this static shock is not harmful, it is uncomfortable and unpleasant and difficult to avoid.

SUMMARY OF THE INVENTION

It is one object of the present invention therefore to provide an apparatus and method for preventing static shock.

According to one aspect of the invention there is provided an apparatus for discharging static electricity between a person and an object to prevent shock to the person comprising a first manually engageable contact, a second contact for contacting the object and a ground therebetween.

Preferably the apparatus comprises a manually transportable element.

Preferably the manually transportable element comprises a keyholder.

Preferably the manually engageable contact is arranged for contact with the key ring such that connection to the person is effected through the keys and key ring.

Preferably the manually transportable element comprises a bracelet.

Preferably the manually transportable element comprises a writing element

Preferably the contacts and the discharging device are housed in a plastic container.

Preferably the apparatus is mounted on a metal body and provides the first contact which is presented toward the person with a second contact being attached to the metal body.

Preferably the first contact comprises a pad presented forwardly of the metal body on the front face of a support housing.

According to a second aspect of the invention there is provided a method for discharging static electricity between a person and an object to prevent shock to the person comprising:

providing a body having a first manually engageable contact, a second contact for contacting the object and a discharging device therebetween;

causing the person to engage the first contact while the second is in engagement with the object;

and arranging the parameters of the discharging device such that the voltage is discharged effectively without delay but at a rate to prevent shock to the person.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

The apparatus of the present invention comprises a plastic or non-conducting body 10 having at one point on the body a first contact 11 which can be contacted by the person and having at a second point on the body a second contact 12 for engaging a metal or grounded object. Embedded within the plastic body 10 is a connection 13 between the two contacts of sufficient resistance to reduce the current flow as the static voltage discharges to a level which avoids static shock.

In one example the resistance is of the order of 10 megohms which slows the discharge time to a few tenths of a second and reduces the current to a level so that it can no longer be felt and thus cause static shock. The discharging time is arranged to be equal to about the human reaction time so that the person touches the contact and removes the device or removes the finger from the fixed device without waiting for discharge to occur.

Figure 1:
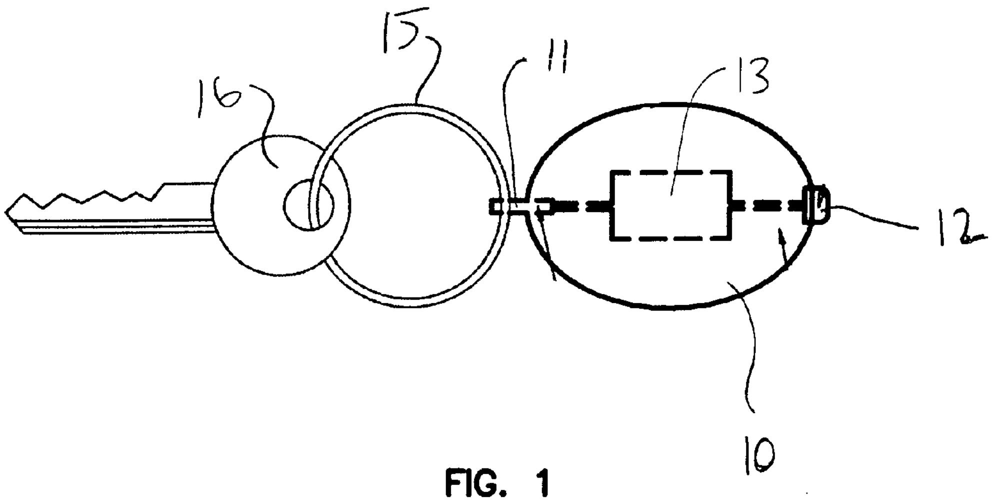
FIG. 1 is side elevational view of the first embodiment of the apparatus according to the present invention.
Figure 2:
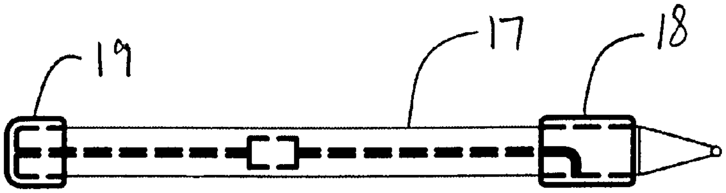
FIG. 2 is a schematic elevational view of the second embodiment.

In FIGS. 1 and 2, the discharge device is a manually transportable element. In FIG. 1 it is shown as a key holder where the first contact 11 comprises a ring in connection with the key ring 15 so that the keys 16 themselves act as a first contact to be held in the hand of the user. The second contact is presented at an end of the generally elliptical body so that the user holds the body between the thumb and forefinger and simply touches the metal contact 12 to an adjacent grounded portion such as the car body so that the discharge occurs rapidly without waiting but without shock.

In FIG. 2, another example is shown which is a pen 17 where the first contact comprises a collar 18 on the pen and a second contact 19 is at the butt end of the pen. The manually transportable device can be incorporated into any other structure normally carried by a person such as a lighter, bracelet or even a wallet or purse.

Figure 3:
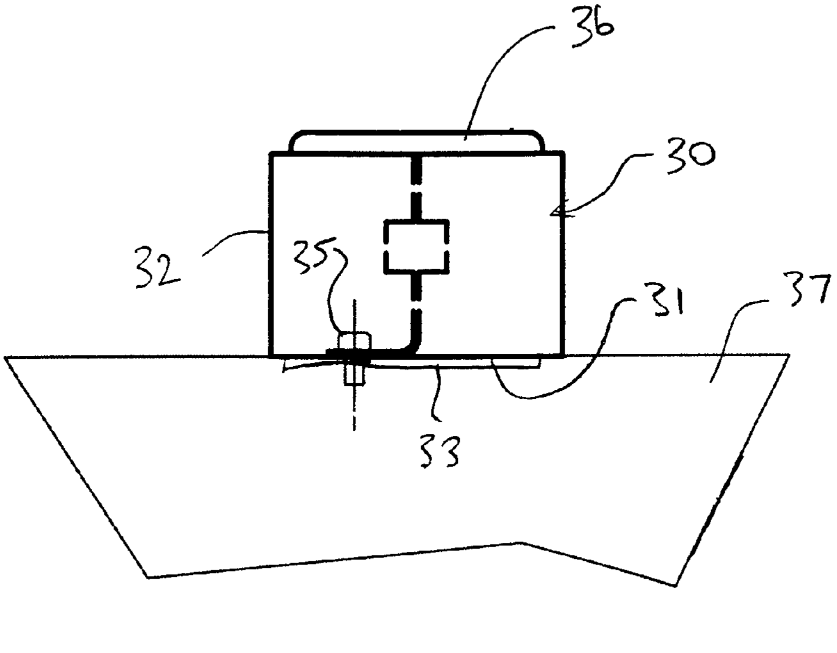
FIG. 3 is a schematic plan view of a third embodiment in which the apparatus is fixed to an existing metal device.

In FIG. 3 is shown an alternative arrangement wherein there is a plastic or non-conductive body 30 which is cylindrical in shape with a cylindrical outer wall 32 and a circular flat bottom face 31 which is attached to a metal object such as a door, car or filing cabinet. The body can be simply attached by a double sided adhesive pad 33 to a front face 34 of the object. The second contact is arranged to be maintained in contact with the front face for example by a screw 35. However simple spring pressure may also be suitable provided the contact is maintained effectively.

At the circular front face of the cylindrical body is provided a pad member 36 which may have a circular front flat face presented toward the user or may form a recessed or concave cup against which the user presses a finger before touching the metal or grounded structure 37. The structure 37 may be a door, filing cabinet or the like.

In use, therefore, the person approaches the metal structure 37 and simply touches a finger against the forwardly presented cup or pad so as to effect discharge immediately but without shock thus allowing the person to confidentially reach for the metal structure without danger of shock.

The resistor is only one example of a component which can be used to reduce the current flow. Other components can be used which act to add external resistance between the contacts.

The body can be formed of plastic or any other non-conductive material preferably which can be molded to incorporate the contacts and the resistor.

The key ring arrangement described above may include a leather or similar flexible material fob as the housing with the second contact 12 forming a stud punched through the body of the key ring holder. Thus a conventional fob formed of two overlying sheets of leather or fabric stitched together can have the first contact punched through one sheet and connected to a circuit contained between the sheets. The circuit also connects to the ring at one end of the fob which is housed in a loop of the sheets and thus presented to the interior between the sheets for connection to the circuit. The circuit is protected by two non-conducting sheets over the circuit and separating the circuit from the leather. The circuit consist simply of a plurality of resistors side by side and connected in series.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. Apparatus for discharging static electricity between a person and a grounded object to prevent shock to the person comprising:

a key ring adapted to receive a key thereon;

a non-conductive housing arranged for manual transportation, a first manually engageable contact mounted on the housing in the form of a ring through which the key ring passes to attach the key ring to the housing, a second contact mounted on the housing at a position thereon spaced from the ring for contacting the grounded object;

and a component within the housing and arranged between the ring and the second contact for allowing transmission of current at a rate which is sufficiently low to avoid shock.

2. Apparatus for discharging static electricity between a person and a grounded object to prevent shock to the person comprising:

a non-conductive manually transportable housing arranged for manual transportation, the housing being elongate with a forward end and a rear end, wherein the manually transportable element comprises a writing element with a writing component for marking a surface at the forward end;

a first manually engageable contact mounted on the housing in the form of a collar surrounding the housing at an intermediate position thereon, a second contact at the rear end of the housing for contacting the grounded object;

and a component within the housing and arranged between the first contact and the second contact for allowing transmission of current at a rate which is sufficiently low to avoid shock.

3. Apparatus for discharging static electricity between a person and a grounded object to prevent shock to the person comprising:

a fixed metal object which is maintained stationary relative to the person;

a non-conductive housing;

wherein the housing is fixedly mounted on the fixed metal object at a position thereon which is presented forwardly toward the person;

a first manually engageable contact mounted on the housing in the form of a pad presented forwardly therefrom, a second contact mounted on the housing in electrical connection with the fixed metal object and a component between the first and second contacts for allowing transmission of current at a rate which is sufficiently low to avoid shock.

* * * * *